(12) United States Patent
Fukagawa et al.

(10) Patent No.: US 9,708,187 B2
(45) Date of Patent: Jul. 18, 2017

(54) THERMAL SPRAY MATERIAL

(71) Applicant: NIPPON YTTRIUM CO., LTD., Fukuoka (JP)

(72) Inventors: Naoki Fukagawa, Fukuoka (JP); Satoshi Ariyoshi, Fukuoka (JP)

(73) Assignee: NIPPON YTTRIUM CO., LTD., Fukuoka (JP)

( * ) Notice: Subject to any disclaimer, the term of this patent is extended or adjusted under 35 U.S.C. 154(b) by 7 days.

(21) Appl. No.: 14/390,793

(22) PCT Filed: Oct. 24, 2013

(86) PCT No.: PCT/JP2013/078785
§ 371 (c)(1),
(2) Date: Oct. 6, 2014

(87) PCT Pub. No.: WO2014/112171
PCT Pub. Date: Jul. 24, 2014

(65) Prior Publication Data
US 2015/0111037 A1    Apr. 23, 2015

(30) Foreign Application Priority Data

Jan. 18, 2013 (JP) ................................. 2013-007751

(51) Int. Cl.
| C01B 11/24 | (2006.01) |
| C23C 4/10 | (2016.01) |
| C23C 4/02 | (2006.01) |
| C23C 4/134 | (2016.01) |
| C01F 17/00 | (2006.01) |

(52) U.S. Cl.
CPC .......... *C01B 11/24* (2013.01); *C01F 17/0012* (2013.01); *C01F 17/0062* (2013.01); *C23C 4/02* (2013.01); *C23C 4/10* (2013.01); *C23C 4/134* (2016.01); *C01P 2004/54* (2013.01); *C01P 2004/61* (2013.01); *C01P 2006/10* (2013.01); *C01P 2006/11* (2013.01); *C01P 2006/20* (2013.01); *C01P 2006/21* (2013.01); *Y10T 428/2982* (2015.01)

(58) Field of Classification Search
None
See application file for complete search history.

(56) References Cited

U.S. PATENT DOCUMENTS

| 2002/0015853 A1 | 2/2002 | Wataya et al. |
| 2002/0160189 A1 | 10/2002 | Wataya et al. |
| 2002/0177014 A1* | 11/2002 | Kaneyoshi .......... C01F 17/0043 428/702 |
| 2010/0129670 A1 | 5/2010 | Sun et al. |

FOREIGN PATENT DOCUMENTS

| JP | 2002-115040 | 4/2002 |
| JP | 2003-229142 | 8/2003 |
| JP | 2012-508684 | 4/2012 |

OTHER PUBLICATIONS

International Search Report—PCT/JP2013/078785—Jan. 21, 2014.

* cited by examiner

*Primary Examiner* — Alicia Chevalier
*Assistant Examiner* — Thomas Mangohig
(74) *Attorney, Agent, or Firm* — Young & Thompson

(57) ABSTRACT

A thermal spray material comprising granules containing a rare earth oxyfluoride has a particle diameter of 1 to 150 μm at a cumulative volume of 50 vol % before ultrasonic dispersion and 10 μm or smaller after ultrasonic dispersion at 300 W for 15 minutes as determined by laser diffraction/scattering particle size distribution analysis. The particle diameter after ultrasonic dispersion is one-third or less of that before ultrasonic dispersion. The thermal spray material has an average aspect ratio of 2.0 or lower and a compressibility of 30% or less. When the granules further contain a rare earth fluoride, upon being analyzed by X-ray diffractometry using Cu-Kα or Cu-Kα1 radiation, S1/S2 is preferably ≥0.10. S1=intensity of the maximum peak assigned to the rare earth oxyfluoride. S2=intensity of the maximum peak assigned to the rare earth fluoride, both observed in a 2θ angle range of 20° to 40°.

6 Claims, No Drawings

US 9,708,187 B2

THERMAL SPRAY MATERIAL

TECHNICAL FIELD

This invention relates to a thermal spray material containing a rear earth element.

BACKGROUND ART

A halogen gas is used in an etching step in the fabrication of semiconductor devices. In order to prevent halogen gas corrosion of an etching apparatus, the inner side of the etching apparatus is generally protected by a thermal spray coating made of a highly anti-corrosive substance. Materials containing a rare earth element are often used as one type of such substances.

Known techniques relevant to thermal spray materials containing a rare earth element include a thermal spray material comprising a granulated powder material of a rare earth fluoride having an average primary particle size of 10 μm or smaller, an aspect ratio of 2 or smaller, an average particle size of 20 to 200 μm, and a degree of volume reduction of 30% or less (see Patent Literature 1). A spherically particulate thermal spray material formed of a compound containing a rare earth element including yttrium and having a fracture strength of 10 MPa or higher and an average particle size of 10 to 80 μm is also known (see Patent Literature 2).

The thermal spray material disclosed in Patent Literature 1 is produced by granulating a fluoride of a rare earth element together with a binder using a spray dryer, and firing the granules at a temperature of 600° C. or lower. Patent Literature 1 says in para. [0014] that if the firing temperature exceeds 600° C., an apparent weight loss results, indicating the occurrence of oxidative decomposition and, therefore, the firing for removing the binder should be carried out at or below 600° C. That is, Patent Literature 1 describes that the firing temperature should be 600° C. or lower so as not to cause the rare earth fluoride to oxidatively decompose to produce an oxyfluoride of the rare earth element. Granules of a rare earth fluoride ($LnF_3$), such as those disclosed in Patent Literature 1, easily break due to cleavage fracture of $LnF_3$ and therefore have the problem of instable feed to thermal spray equipment. Granules of $LnF_3$ also have the problem that the coating film formed on a substrate by thermal spraying the granules is liable to separate from the substrate when subjected to a thermal shock.

The spherically particulate thermal spray material of Patent Literature 2 is produced by granulating a slurry of fine powder of a rare earth element-containing compound using a granulator and, when the compound is an oxide, firing the granules at 1200° to 1800° C. The Literature, however, gives no mention of firing conditions and the like for rare earth element-containing compound other than an oxide.

CITATION LIST

Patent Literature

Patent Literature 1: JP 2002-115040A
Patent Literature 2: US 2002/0160189A1

SUMMARY OF INVENTION

Technical Problem

Accordingly, an object of the invention is to provide a thermal spray material that eliminates various disadvantages associated with the aforementioned conventional techniques.

Solution to Problem

As a result of extensive investigations, the present inventors have surprisingly found that granules containing an oxyfluoride of a rare earth element (Ln), hereinafter "LnOF", having specific particle size, aspect ratio, and compressibility provide a granular thermal spray material exhibiting markedly improved stability while being fed to a thermal spray device and that a thermal spray coating formed on a substrate by using the thermal spray granules hardly comes off the substrate even when it is subjected to a thermal shock.

The inventors have also found that an increase in LnOF content in the granules brings about a further reduction of likelihood of the thermal spray coating coming off the substrate.

The invention has been accomplished based on the above findings and provides a thermal spray material comprising granules containing a rare earth oxyfluoride. The thermal spray material of the invention has a cumulative volume particle diameter of 1 to 150 μm at a cumulative volume of 50 vol % before ultrasonic dispersion and 10 μm or smaller after ultrasonic dispersion at 300 W for 15 minutes as determined by laser diffraction/scattering particle size distribution analysis, the cumulative volume particle diameter after ultrasonic dispersion being one-third or less of the cumulative volume particle diameter before ultrasonic dispersion, the thermal spray material having an average aspect ratio of 2.0 or lower, and the thermal spray material having a compressibility of 30% or less.

DESCRIPTION OF EMBODIMENTS

The invention will be described based on its preferred embodiments. The thermal spray material of the invention comprises granules having specific particle diameter, aspect ratio and compressibility and containing an oxyfluoride of a rare earth element (Ln), namely a rare earth oxyfluoride (LnOF). The rare earth oxyfluoride (LnOF) of the invention is a compound composed of a rare earth element (Ln), oxygen (O), and fluorine (F). The LnOF may be a compound having an Ln:O:F molar ratio of 1:1:1. Also, the LnOF may be a compound having an Ln:O:F molar ratio other than 1:1:1. For example, when Ln is Y, examples of the LnOF include $Y_5O_4F_7$ and $Y_7O_6F_9$ as well as YOF. The LnOF may be a single compound or a mixture of two or more of the above described oxyfluorides. The thermal spray material of the invention is powder comprising LnOF-containing granules. The thermal spay material of the invention preferably comprises LnOF-containing granules and may be composed solely of LnOF-containing granules. Where needed, the thermal spray material of the invention may contain other powders. For example, the thermal spay material of the invention may further comprise particles of other than granular form. Particles of other than granular form include those finer than the granules generated as a result of partial grinding of the granules. When the thermal spray material of the invention contains granules and particles of other than granular form, the granules and the particles of other than granular form generally have the same composition. As used herein, the term "granule" or "particle of granular form" refers to a particle of which the D50n hereinafter defined is in the range described below.

One of the characteristics of the thermal spray material of the invention resides in that its particle size at a cumulative volume of 50 vol % determined by laser diffraction/scattering particle size analysis (hereinafter also referred to as D50) falls within a specific range. Specifically, the cumulative volume particle diameter after ultrasonic dispersion at 300 W for 15 minutes (hereinafter also referred to as D50d) is in a specific range, and the ratio of D50d to the cumulative volume particle diameter before ultrasonic dispersion (hereinafter also referred to as D50n), D50d/D50n, is in a specific range. D50d and D50n are determined by, for example, a hereinafter described method using a laser diffraction/scattering particle size distribution analyzer.

The D50n of the thermal spray material of the invention is 1 to 150 μm. Since the thermal spray material of the invention has a D50n of 1 μm or greater, it has good flowability as granules and is stably fed to a thermal spray device. Since the thermal spray material of the invention has a D50n of 150 μm or smaller, the granules easily melt to their center when thermally sprayed to easily form a uniform thermal spray coating. From these viewpoints, the D50n is preferably 2 to 100 μm, more preferably 5 to 80 μm, even more preferably 20 to 60 μm. Granules with D50n falling within that range are obtained by adjusting grinding conditions in the Step 2, the granulating conditions in the Step 4, and the like in a hereinafter described process for producing the thermal spray material of the invention.

It is preferable that the granules that constitute the thermal spray material of the invention be disintegrated to or below a certain particle size by the ultrasonic dispersion treatment described above. The degree of disintegration is represented by D50d/D50n. In general, at a lower D50d/D50n, the granules are more likely to take on a generally spherical shape and have higher flowability. From this standpoint, the D50d of the thermal spray material of the invention is ⅓ or less, preferably ¼ or less, more preferably ⅕ or less, even more preferably 1/10 or less, of the D50n. The D50d of the thermal spray material of the invention is 10 μm or smaller. Since the thermal spray material of the invention has a D50d of 10 μm or smaller, the granules easily melt to their center when thermally sprayed to easily form a uniform thermal spray coating. From this viewpoint, the D50d of the thermal spray material is preferably 8 μm or smaller, more preferably 6 μm or smaller, even more preferably 3 μm or smaller. Although there is no lower limit on D50d, the D50d is preferably 0.1 μm or greater, more preferably 1.0 μm or greater, from the viewpoint of ease of production of the thermal spray material. From the same viewpoint, the D50d is preferably 1/200 or greater, more preferably 1/50 or greater, of the D50n. Granules with D50d falling within that range are obtained by adjusting grinding conditions in the Step 2, the firing conditions in the Step 1 and the Step 5, and the like in the hereinafter described process for producing the thermal spray material of the invention.

The thermal spray material has an average aspect ratio of 2.0 or lower. As used herein, the term "aspect ratio" denotes a length-to-breadth ratio of a granule, and the term "average aspect ratio" refers to an arithmetic average of individual granules' aspect ratios. With an average aspect ratio of 2.0 or lower, the granular thermal spray material flows well and is stably fed to a thermal spray device. From this point of view, the average aspect ratio of the thermal spray material is preferably 1.8 or lower, more preferably 1.6 or lower. The lower limit of the average aspect ratio is in theory 1.0. While the nearer 1.0 the average aspect ratio, the higher the flowability, a suitable average aspect ratio is 1.02 or higher in terms of ease of production. The thermal spray material with an average aspect ratio falling within that range is obtained by adjusting slurrying conditions in the Step 3, the granulating conditions in the Step 4, and the like in the hereinafter described process for producing the thermal spray material of the invention.

The average aspect ratio can be determined by taking a micrograph of the granules using a scanning electron micrograph (SEM) at a magnification preferably of 1000/D50n to 50000/D50n times, more preferably of 2000/D50n to 40000/D50n times, even more preferably of 3000/D5-n to 30000/D50n times. At least 20 granules that do not overlap with any other granule are micrographed. If necessary, two or more SEM microgaphs are taken from different fields of view. The lengths and breadths of the 20 or more non-overlapping granules in the micrographs, which are enlarged if needed, are measured to calculate aspect ratios of the individual granules, from which an arithmetic average is obtained as an average aspect ratio. The number of the granules of which the aspect ratio is to be measured is more preferably 30 or more, even more preferably 50 or more.

The thermal spray material of the invention has a compressibility of 30% or less. The compressibility is defined by the following formula, wherein TD is a tapping density (g/cc), and AD is an apparent density (loose bulk density) (g/cc).

Compressibility (%)=(TD−AD)/TD×100

Since the compressibility of the thermal spray material of the invention is 30% or less, the granules flow well and are stably fed to a thermal spray device. From this standpoint, the compressibility is preferably 25% or less, more preferably 20% or less. While the lower the compressibility, the higher the flowability, the compressibility is preferably 2% or higher, more preferably 3% or higher, even more preferably 5% or higher, in terms of ease of production of the thermal spray material. The TD and AD may be determined using, for example, Powder Properties Analyzer Multi-tester MT-1000 from Seishin Enterprise Co., Ltd. The thermal spray material with the compressibility falling within the above range is obtained by adjusting slurrying conditions in the Step 3, the granulating conditions in the Step 4, and the like in the hereinafter described process for producing the thermal spray material of the invention.

It is preferred for the thermal spray material comprising granules to have a fracture strength of 0.3 MPa or higher and lower than 10 MPa, more preferably a fracture strength of 0.5 to 9 MPa. With the fracture strength of 0.3 MPa or higher, the granules are effectively prevented from fracture. Prevention of granule fracture is advantageous in that reduction of flowability of the granules is prevented so that the granules may be fed into a flame efficiently. With the fracture strength of less than 10 MPa, the thermal spray material is easily disintegrated in a flame to melt completely in the flame, whereby the resulting thermal spray coating will have increased smoothness. Granules with the fracture strength falling within the above range may be obtained by, for example, adopting a spray dry method hereinafter described and properly selecting firing conditions in the step of firing the spray-dried granules.

The fracture strength of granules is determined in accordance with formulae (14-a) and (14-b) described in Hiramatsu, Oka, and Kiyama, "Rapid Determination of the Tensile Strength of Rocks with Irregular Test Pieces", Nihon Kogyo Kaishi, vol. 81, No. 932, pp. 1024-1030 (1965-12). In detail, the determination is performed as follows. When the granules have a D50n of 38 to 850 µm, the D50n is compared with the sizes of openings described as "supplementary sizes of sieves" in Table 2 of JIS Z8801-1. When the D50n is less than 38 µm and more than 20 µm, the D50n is compared with the sizes of openings described as "principal sizes of sieves" in the same table. Two test sieves the opening sizes of which are adjacent to the D50n are used. The test sieve with a larger opening size is stacked on the other test sieve with a smaller opening size. The granules are put on the upper sieve and sieved through the stack of the sieves, and granules that pass through the upper sieve and do not pass through the lower sieve are harvested as a sample. When the D50n is 20 µm or smaller, a sample is obtained in the same manner as for the granules having a D50n of larger than 20 µm up to 850 µm using test sieves described as principal sizes of nominal sizes of openings (ISO) in Table 1 of JIS Z8801-3. For example, in the case of granules whose D50n is about 50 µm, a test sieve with an opening size of 53 µm is stacked on a test sieve with an opening size of 45 µm. A thermal spray material is put on the upper sieve with an opening size of 53 µm and sieved through the stack of the sieves, and granules that pass through the upper sieve and do not pass through the lower sieve are harvested as a sample. The compressive load of the sample is measured using a micro-compression tester MCT M-500 (with a 50 µm diameter flat indenter) from Shimadzu Corp. under the conditions of a test force of 9.8 mN (1 gf) and a compression velocity of 0.446 mN/sec. The fracture strength St (MPa) of a granule is calculated from the compressive load P (N) on the sample and the particle diameter d (mm) according to formula (1):

$$St=2.8P/(\pi d^2) \quad (1)$$

The thermal spray material of the invention is further characterized by comprising granules containing, for example, a rare earth (Ln) oxychloride (LnOF). The granules may be made solely of LnOF or may contain other substances in addition to LnOF. The thermal spray material may contain, as other substances, a rare earth fluoride ($LnF_3$) and/or a rare earth oxide ($Ln_2O_3$).

Containing LnOF, the thermal spray material of the invention forms a thermal spray coating that hardly comes off a substrate even when it is subjected to a thermal shock. While, a thermal shock on a thermal spray coating is considered to allow oxygen to enter $LnF_3$ present in the coating and to initiate cracking in the coating thereby reducing the adhesion of the coating to the substrate, it is believed that this phenomenon is reduced by the presence of LnOF in the coating. In addition, because of the presence of LnOF having higher strength than $LnF_3$ having cleaving properties, the granules exhibit increased strength and high stably in being fed to a thermal spray device.

When the thermal spray material of the invention contains $LnF_3$, the ratio of $LnF_3$ to LnOF is adjustable by the firing conditions in the Step 1 and Step 5 in the hereinafter described process for producing the thermal spray material of the invention. It is not easy to accurately determine the amount of $LnF_3$ present in the thermal spray material of the invention. Then, in the invention, the X-ray diffraction pattern of the thermal spray material is analyzed, and the $LnF_3$ content is estimated from the relative intensities of the maximum peak of LnOF and the maximum peak of $LnF_3$. In detail, the thermal spray material is analyzed by X-ray diffractometry using Cu-Kα or Cu-Kα1 radiation. A ratio of the maximum peak intensity (S1) assigned to LnOF in a 2θ angle range of from 20° to 40° to the maximum peak intensity (S2) assigned to $LnF_3$ in the same range, S1/S2, is obtained. It is preferred for the thermal spray material of the invention to have an S1 to S2 ratio, S1/S2, of 0.10 or greater so as to prevent the thermal spray coating from separating from a substrate on receipt of a thermal shock more efficiently. The S1/S2 is more preferably 0.20 or greater, even more preferably 0.30 or greater. To ensure prevention of thermal shock-induced separation of a thermal spray coating from a substrate, the granules preferably comprise LnOF, and the higher the S1/S2, the better.

While the thermal spray material of the invention may contain $LnF_3$ in addition to LnOF as discussed above, it is preferred for the thermal spray material not to contain, or as little as possible, $Ln_2O_3$ that is an oxide of a rare earth element alone from the viewpoint of anti-corrosion properties, particularly against a chlorine-containing gas, of the thermal spray coating. The $Ln_2O_3$ content in the thermal spray material can be minimized by, for example, selecting proper conditions in firing $LnF_3$ in an oxygen-containing atmosphere in the Step 1 and Step 5 in the hereinafter described process for producing the thermal spray material.

Because it is not easy to quantitatively determine the $Ln_2O_3$ content in the thermal spray material of the invention by chemical analyses, in the invention, the $Ln_2O_3$ content is estimated from the intensity of a peak in X-ray diffractometry of the thermal spray material. In detail, the thermal spray material is analyzed by X-ray diffractometry using Cu-Kα or Cu-Kα1 radiation. A ratio of the maximum peak intensity (S0) assigned to a rare earth oxide in a 2θ angle range of from 20° to 40° to the maximum peak intensity (S1) assigned to a rare earth oxyfluoride in the same range, S0/S1, is obtained. In the invention, the S0/S1 is preferably 0.10 or smaller, more preferably 0.05 or smaller, even more preferably 0.01 or smaller. The S0/S1 may be 0. The maximum diffraction peak assigned to, e.g., yttrium oxide ($Y_2O_3$) usually appears at a 2θ angle of around 29.1°.

Rare earth elements (Ln) include 16 elements: scandium (Sc), yttrium (Y), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu). The thermal spray material of the invention contains at least one of these 16 rare earth elements. To further ensure the heat resistance, wear resistance, and corrosion resistance of the thermal spray material, it is preferred to use at least one of yttrium (Y), samarium (Sm), gadolinium (Gd), dysprosium (Dy), erbium (Er), and ytterbium (Yb), particularly yttrium (Y).

In the case where the thermal spray material contains a rare earth fluoride ($LnF_3$), the rare earth element (Ln) of the rare earth fluoride ($LnF_3$) is usually the same as that of the rare earth oxyfluoride (LnOF) contained in the thermal spray material but may be different therefrom. When the thermal spray material contains a rare earth oxide ($Ln_2O_3$), the rare earth element (Ln) of the rare earth oxide ($Ln_2O_3$) is usually the same as that of the rare earth oxyfluoride (LnOF) contained in the thermal spray material but may be different therefrom.

A suitable process for producing the thermal spray material of the invention will then be described. The process is roughly divided into the following five steps, which will be described in sequence:

step 1 firing a rare earth fluoride ($LnF_3$) in an oxygen-containing atmosphere at a predetermined firing temperature;

step 2 grinding the fired product obtained in step 1;

step 3 mixing the ground fired product obtained in step 2 with a solvent to prepare a slurry;

step 4 granulating the slurry from step 3 using a spray dryer to obtain granules; and step 5 firing the granules obtained in step 4 at a temperature higher than that used in the step 1 to obtain granules containing a rare earth oxyfluoride (LnOF).

Step 1:

In step 1, a rare earth fluoride ($LnF_3$) is used as a raw material. The $LnF_3$ may be a fluoride of at least one of the above enumerated 16 elements.

The rare earth fluoride ($LnF_3$) can be synthesized through various methods. A wet synthesis process is preferred to obtain a uniform, high-purity product with ease. For example, $LnF_3$ is synthesized by mixing a solution of an acid-soluble compound of a rare earth element, such as an oxide, carbonate, or hydroxide of a rare earth element, in nitric acid or hydrochloric acid or a solution of a water-soluble compound of a rare earth element, such as a nitrate or chloride of a rare earth element, in water or a water/acid mixed solvent with a fluorine-containing water-soluble compound, such as hydrofluoric acid or ammonium fluoride, to form a precipitate of the $LnF_3$, washing the precipitate, followed by filtration, and drying the filter cake. In another method, the $LnF_3$ is obtained by suspending a carbonate, oxalate, hydroxide, oxide, etc. of a rare earth element in water to obtain a slurry, adding a fluorine-containing water-soluble compound to the resulting slurry to form a precipitate of the $LnF_3$, which is then washed, filtered, and dried.

In step 1, the rare earth fluoride ($LnF_3$) is fired. The firing in this step may or may not produce a rare earth oxyfluoride (LnOF). Generally speaking, the likelihood of producing an LnOF increases with the firing temperature or the length of the firing time. As the firing temperature is further raised or the firing time is further extended, the degree of production of the LnOF increases, and the residue of the $LnF_3$ decreases. As the firing temperature is furthermore raised or the firing time is furthermore extended, a rare earth oxide ($Ln_2O_3$) and the like start to be by-produced.

The rare earth fluoride ($LnF_3$) firing temperature in step 1 is preferably 300° to 1050° C. Setting the firing temperature at 300° C. or higher is effective, in conjunction with setting the firing temperature in step 5 higher than the firing temperature in step 1, in improving the flowability of the granules and the stability of feeding the granules to a thermal spray device. Setting the firing temperature at 1050° C. or lower facilitates the grinding operation in step 2. From these viewpoints, the rare earth fluoride ($LnF_3$) firing temperature is more preferably 350° to 1000° C.

Provided that the firing temperature is in the range recited above, the firing time is preferably 1 to 48 hours, more preferably 2 to 36 hours, in terms of improving the flowability of the granules and facilitating the grinding operation in step 2. The firing is preferably carried out in an oxygen-containing atmosphere in the interest of producing LnOF, and the atmosphere will be convenient for carrying out the firing. The firing may be conducted in other atmospheres, such as an inert atmosphere.

Step 2:

In step 2, the fired product obtained in step 1 is ground. The grinding may be either dry grinding or wet grinding. The grinding may be effected either in a single stage or multiple (two or more) stages. In particular, when the fired product obtained in step 1 is massive or lumpy, it is advisable to perform the grinding in multiple stages using a grinding apparatus appropriately selected for each stage. In view of cost and effort, the multiple stage grinding is preferably two-stage grinding.

In the case when step 2 is carried out by wet grinding either directly or after dry grinding, it is possible that the wet grinding operation also accomplishes step 3 hereinafter described. Dry grinding may be effected using various dry grinding mills, such as an attritor, a jet mill, a ball mill, a hammer mill, and a pin mill. Wet grinding may be achieved using various wet grinding mills, such as a ball mill and a bead mill.

The fired product is preferably ground to an extent that (i) the ground product has a D50 of 8 μm or smaller as measured immediately after completion of this step using a laser diffraction/scattering particle size distribution analyzer, (ii) the D50 of the ground product ranges from 30% to 95% of a target D50d, or (iii) the D50 of the ground product is ¼ or less of a target D50n. It is particularly preferred to carry out the grinding to an extent that satisfies all the conditions (i) to (iii). To carry out grinding to such an extent, in conjunction with setting the firing temperature in step 5 high, makes it easy to form granules the D50d and D50n of which fall within the above described respective ranges. In this regard, the D50 is preferably 6 μm or less, more preferably 5 μm or less; the D50 is preferably 40% to 90%, more preferably 50% to 80%, of a target D50d; and the D50 is preferably ⅕ or less, more preferably ⅙ or less, of a target D50n. The D50 is preferably not less than 0.1 μm and not less than 1/200 of a target D50n in consideration of the labor of grinding.

Step 3:

In step 3, the ground fired product obtained in step 2 is stirred in a solvent to make a slurry. Any solvent may be used, including water and various organic solvents. In order to successfully obtain granules by spray drying in the subsequent step, the concentration of the ground fired product in the slurry is preferably 100 to 2000 g/L, more preferably 200 to 1500 g/L. With the slurry concentration being in that range, excessive energy consumption is avoided, and the viscosity of the slurry is appropriate to stabilize spraying. Setting the slurry concentration in that range facilitates forming a thermal spray material the aspect ratio and compressibility of which are in the above described respective ranges.

Step 4:

In step 4, the slurry prepared in step 3 is granulated using a spray dryer to obtain granules containing the LnOF. In operating a spray dryer, the atomizer is preferably rotated at a number of revolutions of 5000 to 30000 $min^{-1}$. At a number of revolutions of 5000 $min^{-1}$ or greater, the LnOF and others are sufficiently dispersed in the slurry, thereby to provide uniform granules. At a number of revolutions of 30000 $min^{-1}$ or smaller, granules with a desired particle size are obtained easily. For these considerations, the number of revolutions of the atomizer is more preferably 6000 to 25000 $min^{-1}$.

In operating the spray dryer, the inlet temperature is preferably set at 150° to 300° C. At an inlet temperature of 150° C. or higher, the solid matter dries sufficiently to give granules with a reduced residual water content. At an inlet temperature of 300° C. or lower, useless energy consumption is reduced.

Step 5:

In step 5, the granules obtained in step 4 are fired to afford granules containing the LnOF. The firing temperature in this step is preferably set higher than that in step 1, in which case it is easy to give granules the D50d of which falls in the range recited. This is because, the inventors believe, sintering is accelerated slightly by setting the D50 after the grinding of step 2 smaller than a target D50d and setting the firing temperature higher than that in step 1, thereby resulting in production of granules having the target D50d. In this regard the firing temperature in step 5 is preferably higher than that in step 1 by at least 50° C., more preferably by 100° C. or more. It should be noted, however, that firing at too much higher a temperature than the firing temperature in step 1 renders it difficult to control the degree of sintering. Therefore, the firing temperature in step 5 is preferably such that a difference calculated by subtracting the firing temperature in step 1 from that in step 5 is 750° C. or smaller, more preferably 700° C. or smaller.

The firing temperature in step 5 is preferably higher than 900° C. and not higher than 1100° C., provided that it is higher than the firing temperature in step 1. The LnOF is produced sufficiently at a firing temperature higher than 900° C. Consumption of energy and the like is reduced by producing the LnOF from the $LnF_3$ after the grinding and granulation in steps 2 through 4 rather than by producing the LnOF from the $LnF_3$ before the grinding of step 2. The LnOF production efficiency can thus be increased by setting the firing temperature in step 5 higher than that in step 1 and higher than 900° C. Production of $Ln_2O_3$ is suppressed at a firing temperature of 1100° C. or lower. From these considerations, the firing temperature is more preferably 925° to 1075° C., even more preferably 950° to 1050° C.

The firing time is more preferably 1 to 48 hours, even more preferably 2 to 36 hours, provided that the firing temperature is in the range recited above. The firing is desirably carried out in an oxygen-containing atmosphere in the interest of producing a rare earth oxyfluoride (LnOF) from a rare earth fluoride ($LnF_3$). The atmosphere is a convenient oxygen-containing atmosphere because there is no need for atmosphere adjustment.

The thermal spray material thus obtained is suitably used in various thermal spraying techniques, such as plasma thermal spraying. Examples of substrates to be coated by thermal spraying include various metals, such as aluminum, various alloys, such as aluminum alloys, various ceramics, such as alumina, and quartz. The thermal spray material of the invention is suitable as not only a thermal spray material but also a material of ceramic parts. In some detail, the thermal spray material of the invention may be used as a raw material of ceramic parts manufactured by, for example, common pressing, cold isostatic pressing (CIP), or hot isostatic pressing (HIP) to provide ceramic parts excellent in surface smoothness and non-dustiness. Such a ceramic part is suited for use as an electronic material or a jig used in firing an electronic material.

EXAMPLES

The invention will now be illustrated in greater detail with reference to Examples, but it should be understood that the invention is not deemed to be limited thereto. Unless otherwise noted, all the percents are by mass.

Example 1

A thermal spray material was prepared according to the following procedures (a) through (d).
(a): Step 1
(a-1) Wet Synthesis of Yttrium Fluoride In 400 L of pure water being stirred was poured 300 kg of 99.9% yttrium oxide to prepare a slurry. To the slurry was added 550 L of a 15 mol/L aqueous solution of nitric acid at a rate of 5 L/min, and the stirring was further continued for 30 minutes. The slurry was filtered in vacuo to give 1100 L of a solution containing 270 g (in terms of $Y_2O_3$) of a solute per liter.

To the solution being stirred was added 300 L of 50% hydrofluoric acid at a rate of 5 L/min to form a precipitate of yttrium fluoride. Sedimentation of the precipitate, removal of the supernatant, addition of pure water, and repulping were conducted twice, followed by sedimentation, and followed by removal of the supernatant. The resulting wet solid was placed in a polytetrafluoroethylene tray and dried at 150° C. for 48 hours. The dried solid was ground to give yttrium fluoride. An X-ray diffractogram of the thus obtained yttrium fluoride showed only the diffraction peaks assigned to $YF_3$ with no peaks of yttrium oxyfluoride (YOF).
(a-2) Firing of Yttrium Fluoride The yttrium fluoride obtained in (a-1) was put in an alumina container and fired in the atmosphere in an electric oven at the firing temperature for the firing time shown in Table 1 below.
(b): Steps 2 and 3

The fired product obtained in step 1 was put in a bead mill together with pure water and wet-ground to a D50 of 1.0 to 2.0 μm measured with Microtrack HRA. An additional amount of water was added to the ground product to give a slurry having a concentration of 500 g/L.
(c): Step 4

The slurry obtained in step 3 was granulated and dried using a spray dryer from Ohkawara Kakohki Co., Ltd. under the following conditions:
Feed rate of slurry: 300 ml/min
Number of revolutions of atomizer: 9000 $min^{-1}$
Inlet temperature: 200° C.
(d): Step 5

The granules obtained in step 4 were put in an alumina container and fired in the atmosphere in an electric oven at the firing temperature for the firing time shown in Table 1 below.

There was thus obtained a desired thermal spray material.

Examples 2 to 12 and Comparative Example 1

A thermal spray material was obtained in the same manner as in Example 1, except for altering the firing temperature in step 1 and/or step 5 as shown in Table 1.

TABLE 1

| | Firing Condition in Step 1 | | Firing Condition in Step 5 | |
|---|---|---|---|---|
| | Firing Temperature (° C.) | Firing Time (h) | Firing Temperature (° C.) | Firing Time (h) |
| Example 1 | 300 | 12 | 1000 | 12 |
| Example 2 | 350 | | | |
| Example 3 | 400 | | | |
| Example 4 | 500 | | | |
| Example 5 | 600 | | | |
| Example 6 | 700 | | | |
| Example 7 | 800 | | | |
| Example 8 | 900 | | | |
| Example 9 | 950 | | | |
| Comparative Example 1 | 300 | 12 | 300 | 12 |
| Example 10 | 600 | 12 | 950 | 12 |
| Example 11 | | | 1050 | 12 |
| Example 12 | | | 1100 | 12 |

TABLE 1-continued

| | Firing Condition in Step 1 | | Firing Condition in Step 5 | |
|---|---|---|---|---|
| | Firing Temperature (° C.) | Firing Time (h) | Firing Temperature (° C.) | Firing Time (h) |
| Comparative Example 2 | 600 | 12 | 1000 | 12 |
| Comparative Example 3 | | | | |
| Comparative Example 4 | Commercial Product (Y$_2$O$_3$) | | 1300 | 12 |
| Examples 13 to 18 | 600 | 12 | 1000 | 12 |

Comparative Examples 2 and 3

A thermal spray material was prepared in the same manner as in Example 5, except for altering the conditions of steps 2 to 4 as shown in Table 2.

TABLE 2

| | Step 3 | Step 4: Granulation Conditions | | | |
|---|---|---|---|---|---|
| | Step 2 D50 after Grinding (μm) | Slurry Concentration (g/L) | Feed Rate of Slurry (mL/min) | Number of Revolution of Atomizer (min$^{-1}$) | Inlet Temperature (° C.) |
| Comparative Example 2 | 1.8 | 2100 | 200 | 32000 | 200 |
| Comparative Example 3 | 12.3 | 1000 | 200 | 5000 | 200 |
| Examples 13 to 18, and Comparative Examples 1 and 4 | 1.0 to 2.0 | 500 | 300 | 9000 | 200 |

Comparative Example 4

An yttrium oxide thermal spray material was prepared by starting with commercially available yttrium oxide. The yttrium oxide was subjected to the same procedures of steps 2 through 4 of Example 1. The product from step 4 was processed according to the same procedure of step 5 of Example 1, except for changing the firing temperature to 1300° C.

Example 13

Example 13 demonstrates the production of a thermal spray material containing a rare earth element other than yttrium.

(a): Step 1
(a-1) Wet Synthesis of Yttrium Samarium Fluoride

Samarium oxide was used in place of the yttrium oxide used in step 1 of Example 1. The used amount of the samarium oxide was as shown in Table 3. The samarium oxide was poured into 40 L of pure water being stirred to prepare a slurry. To the slurry was added 55 L of a 15 mol/L aqueous solution of nitric acid at a rate of 5 L/min, and the stirring was continued for an additional period of 30 minutes. To the resulting solution being stirred was added 30 L of 50% hydrofluoric acid at a rate of 5 L/min to form a precipitate. Sedimentation of the precipitate, removal of the supernatant, addition of pure water, and repulping were conducted twice, followed by sedimentation, and followed by removal of the supernatant. The resulting wet solid was placed in a polytetrafluoroethylene tray and dried at 150° C. for 48 hours. The dried solid was ground to give samarium fluoride.

(a-2) Firing of Samarium Fluoride

The fluoride obtained in (a-1) was put in an alumina container and fired in the atmosphere in an electric oven at 600° C. for 12 hours.

(b): Steps 2 to 5

Steps 2 to 5 were carried out in the same manner as in Example 5 to yield a desired thermal spray material.

Examples 14 to 18

Similarly to Example 13, Examples 14 to 18 demonstrate the production of thermal spray materials containing a rare earth element other than yttrium. A desired thermal spray material was produced in the same manner as in Example 13, except for replacing samarium oxide used in step 1 with the rare earth element oxide shown in Table 3 in the amount shown.

In Example 18, the molar fraction of ytterbium oxide to the total amount of yttrium oxide and ytterbium oxide was 0.1.

TABLE 3

| | Rare earth element Ln | | Used Amount of Ln$_2$O$_3$ (kg) | |
|---|---|---|---|---|
| | First element | Second element | First element | Second element |
| Example 13 | Sm | — | 46.3 | — |
| Example 14 | Gd | — | 48.2 | — |
| Example 15 | Dy | — | 49.6 | — |
| Example 16 | Er | — | 50.8 | — |
| Example 17 | Yb | — | 52.4 | — |
| Example 18 | Y | Yb | 27.0 | 5.24 |

Evaluation:

The thermal spray materials obtained in Examples and Comparative Examples were analyzed by X-ray diffractometry under the conditions described infra to obtain an X-ray diffractogram. The relative intensities S2, S1, and S0 of the maximum peaks of LnF$_3$, LnFO, and Ln$_2$O$_3$, respectively, were calculated from the X-ray diffractogram, from which S1/S2 and S0/S1 were calculated. In Example 18, the total intensity of the maximum peak of YOF and the maximum peak of YbOF was taken as S1, the total intensity of the maximum peak of YF$_3$ and the maximum peak of YbF$_3$ was taken as S2, and the total intensity of the maximum peak of Y$_2$O$_3$ and Yb$_2$O$_3$ was taken as S0.

The average aspect ratio, D50n (μm), and D50d (μm) of each thermal spray material obtained in Examples and Comparative Examples were obtained by the methods described infra. TD (g/cc) and AD (g/cc) of the thermal spray materials were obtained by the method described supra, and the compressibility (%) was obtained from the TD and AD values. The fracture strength (MPa) of the thermal spray materials was determined by the method described supra. The flowability of the granules being fed to carry out thermal spraying and the resistance of the thermal spray coating formed to separation from a substrate after exposure to thermal shock (heat resistance) were evaluated by the methods described below. The results obtained are shown in Table 4.

(1) X-Ray Diffractometry
Apparatus: Ultima IV (from Rigaku Corp.)
Ray source: CuKα radiation
Tube voltage: 40 kV
Tube current: 40 mA
Scan rate: 2°/min
Step: 0.02°
Scan range: 2θ=20° to 40°

(2) Average Aspect Ratio

The thermal spray material was micrographed using a scanning electron micrograph S-3000N available from Hitachi Science Systems, Ltd. at a magnification of 500 times in Comparative Example 2, 50 times in Comparative Example 3, and 200 times in Examples and other Comparative Examples from different fields of view until images of at least 50 granules that did not overlap with one another were obtained.

The micrographs were 141% enlarged using a copier. The length and breadth of 50 granules were measured with a ruler down to tenths of a millimeter, from which the aspect ratio of the individual granules was calculated. The total of the aspect ratios was divided by 50 to give an average aspect ratio.

(3) D50n

Measurements were taken using Microtrac HRA available from Nikkiso Co., Ltd. A 0.2% aqueous solution of sodium hexametaphosphate was used as a suspending medium. A sample (granules) was added to the chamber of the sample circulator of Microtrac HRA until the instrument judged the concentration of the sample to be adequate.

(4) D50d

In a 100 mL glass beaker was put 0.1 to 1 g of a sample, and about 100 ml of a 0.2% aqueous solution of sodium hexametaphosphate. The beaker containing the sample and 100 ml of a 0.2% aqueous solution of sodium hexametaphosphate was set on an ultrasonic homogenizer US-300 (300 W) from Nihon Seiki Kaisha Ltd. and subjected to ultrasonication for 15 minutes to prepare a slurry. The slurry was dropped into the chamber of the sample circulator of Microtrac HRA from Nikkiso until the instrument judged the concentration to be adequate.

(5) Flowability of Granules being Fed in Thermal Spraying

A 100 mm square aluminum alloy plate was used as a substrate. The substrate was coated by plasma thermal spraying using a powder feeder Twin-System 10-V (from Plasma-Technik AG) and an F4 plasma spray gun (from Sulzer Metco). The plasma thermal spraying was carried out using Ar/$H_2$ as plasma gases at a number of resolutions of the disk of 50%, a carrier gas flow rate of 2.5 L/min, a feed scale of 10%, an output power of 35 kW, and an apparatus-substrate spacing of 150 mm to a coating thickness of about 100 μm.

During the plasma thermal spraying, flowability of the granules being fed to the powder feeder was observed with the naked eye and rated as follows.

Very good: The granules flow uniformly with no pulsation.
Good: The flow of granules involves a slight pulsation, which is practically non-problematic.
Bad: The flow of granules involves a great pulsation, which in some cases raises the need to clean the feeder.

(6) Heat Resistance of Thermal Spray Coating (Resistance of Thermal Spray Coating to Separation from Substrate when Subjected to Thermal Shock)

The aluminum alloy plate (substrate) having a thermal spray coating was heated at 600° C. for 10 minutes and then immersed in 20° C. water. The coating was inspected with the naked eye to see if it had come off the substrate. The heating and immersing operations were repeated until separation of the thermal spray coating from the substrate was observed.

TABLE 4

| | Granules | | | | | | | | | | | | | Flowability | Thermal Spray Thermal Shock Test (Number of Times of Tests till Separation of Thermal |
|---|---|---|---|---|---|---|---|---|---|---|---|---|---|---|---|
| | X-ray diffractogram relative intensity | | | | | | Average | | | | | Compress- | Fracture | of | |
| | $LnF_3$ (S2) | LnOF (S1) | $Ln_2O_3$ (S0) | S1/S2 | (S0/S1) | Ln element | aspect ratio | D50n (μm) | D50d (μm) | TD (g/cc) | AD (g/cc) | ibility (%) | Strength (MPa) | Granules being Fed | Spray Coating) |
| Example 1 | 100 | 10 | 0 | 0.10 | 0 | Y | 1.49 | 58 | 1.7 | 1.81 | 1.42 | 22 | 0.5 | Good | 20 times |
| Example 2 | 100 | 18 | 0 | 0.18 | 0 | | 1.32 | 59 | 1.6 | 1.82 | 1.50 | 18 | 0.9 | Very Good | 22 times |
| Example 3 | 100 | 34 | 0 | 0.34 | 0 | | 1.25 | 53 | 1.6 | 1.81 | 1.53 | 15 | 1.7 | Very Good | 29 times |
| Example 4 | 100 | 76 | 0 | 0.76 | 0 | | 1.16 | 51 | 1.8 | 1.85 | 1.58 | 15 | 2.3 | Very Good | 31 times |
| Example 5 | 96 | 100 | 0 | 1.04 | 0 | | 1.10 | 50 | 1.4 | 1.89 | 1.65 | 13 | 3.4 | Very Good | 34 times |
| Example 6 | 73 | 100 | 0 | 1.37 | 0 | | 1.04 | 48 | 1.6 | 1.84 | 1.67 | 9 | 4.2 | Very Good | 36 times |
| Example 7 | 54 | 100 | 0 | 1.85 | 0 | | 1.12 | 45 | 1.3 | 1.87 | 1.75 | 6 | 4.9 | Very Good | 39 times |
| Example 8 | 35 | 100 | 0 | 2.86 | 0 | | 1.15 | 46 | 1.5 | 1.83 | 1.62 | 11 | 5.8 | Very Good | 41 times |
| Example 9 | 21 | 100 | 0 | 4.76 | 0 | | 1.22 | 44 | 1.4 | 1.85 | 1.60 | 14 | 6.7 | Very Good | 42 times |
| Comparative Example 1 | 100 | 0 | 0 | 0 | — | | 1.77 | 75 | 1.3 | 1.72 | 1.31 | 24 | 0.1 | Bad | 7 times |
| Example 10 | 100 | 47 | 0 | 0.47 | 0 | | 1.09 | 48 | 1.8 | 1.85 | 1.56 | 16 | 2.3 | Very Good | 28 times |
| Example 11 | 45 | 100 | 0 | 2.22 | 0 | | 1.13 | 45 | 2.1 | 1.92 | 1.78 | 7 | 6.4 | Very Good | 40 times |
| Example 12 | 0 | 100 | 5 | — | 0.05 | | 1.16 | 43 | 2.9 | 1.98 | 1.72 | 13 | 9.7 | Good | 35 times |
| Comparative Example 2 | 100 | 90 | 0 | 0.90 | 0 | | 2.21 | 17 | 1.9 | 1.90 | 1.24 | 35 | 0.5 | Bad | 19 times |
| Comparative Example 3 | 100 | 45 | 0 | 0.45 | 0 | | 1.28 | 160 | 13.2 | 1.77 | 1.65 | 7 | 1.8 | Good | 9 times |

TABLE 4-continued

| | X-ray diffractogram relative intensity | | | | | Granules | | | | | | | Flowability | Thermal Spray |
|---|---|---|---|---|---|---|---|---|---|---|---|---|---|---|
| | | | | | | Average | | | | | Compress- | Fracture of | | Thermal Shock Test (Number of Times of Tests till Separation of Thermal |
| | LnF₃ (S2) | LnOF (S1) | Ln₂O₃ (S0) | S1/S2 | (S0/S1) | Ln element | aspect ratio | D50n (μm) | D50d (μm) | TD (g/cc) | AD (g/cc) | ibility (%) | Strength (MPa) | Granules being Fed | Spray Coating) |
| Comparative Example 4 | 0 | 0 | 100 | — | — | | 1.13 | 38 | 1.3 | 1.72 | 1.33 | 23 | 15.2 | Good | 15 times |
| Example 13 | 100 | 95 | 0 | 0.95 | 0 | Sm | 1.16 | 50 | 1.5 | 1.75 | 1.52 | 13 | 2.2 | Very Good | 31 times |
| Example 14 | 100 | 99 | 0 | 0.99 | 0 | Gd | 1.12 | 45 | 1.1 | 1.80 | 1.60 | 11 | 2.6 | Very Good | 32 times |
| Example 15 | 95 | 100 | 0 | 1.05 | 0 | Dy | 1.14 | 46 | 1.6 | 1.81 | 1.64 | 9 | 2.9 | Very Good | 32 times |
| Example 16 | 92 | 100 | 0 | 1.09 | 0 | Er | 1.15 | 48 | 1.4 | 1.87 | 1.74 | 7 | 3.6 | Very Good | 35 times |
| Example 17 | 87 | 100 | 0 | 1.15 | 0 | Yb | 1.04 | 42 | 1.3 | 1.90 | 1.80 | 5 | 3.9 | Very Good | 38 times |
| Example 18 | 92 | 100 | 0 | 1.09 | 0 | Y, Yb | 1.12 | 46 | 1.6 | 1.85 | 1.62 | 12 | 3.7 | Very Good | 35 times |

As is apparent from the results in Table 4, the thermal spray material of each Example exhibits high flowability. It is also seen that the thermal spray coating formed of the thermal spray material of each Example hardly comes off the substrate when subjected to a thermal shock. In contrast, the thermal spray material of each Comparative Example is inferior in flowability to the thermal spray materials of Examples or liable to come off the substrate when subjected to a thermal shock.

Comparison between Examples 1 to 12 reveals that the greater the S1/S2 the thermal spray material has, the less likely the thermal spray coating is to come off the substrate when subjected to a thermal shock, namely, the higher the durability it has.

INDUSTRIAL APPLICABILITY

The thermal spray material of the invention has good flowability in being fed to a thermal spray device. A thermal spray coating formed by using the thermal spray material of the invention hardly comes off a substrate even when subjected to a thermal shock, i.e., exhibits excellent durability.

The invention claimed is:

1. A thermal spray material comprising:
   granules containing a rare earth oxyfluoride and a rare earth fluoride,
   the thermal spray material having
   a cumulative volume particle diameter of 1 to 150 μm at a cumulative volume of 50 vol % before ultrasonic dispersion at 300 W for 15 minutes,
   wherein the cumulative volume particle diameter is 10 μm or smaller, after the ultrasonic dispersion at 300 W for 15 minutes, as determined by laser diffraction/scattering particle size distribution analysis,
   the cumulative volume particle diameter of the thermal spray material, after the ultrasonic dispersion at 300 W for 15 minutes, being one-third or less of the cumulative volume particle diameter of the thermal spray material before the ultrasonic dispersion at 300 W for 15 minutes,
   the thermal spray material having an average aspect ratio of 2.0 or lower before the ultrasonic dispersion at 300 W for 15 minutes,
   the thermal spray material having a compressibility of 30% or less before the ultrasonic dispersion at 300 W for 15 minutes, and
   the thermal spray material having a fracture strength of 0.3 MPa to less than 10 MPa before the ultrasonic dispersion at 300 W for 15 minutes,
   wherein, before the ultrasonic dispersion at 300 W for 15 minutes, upon being analyzed by X-ray diffractometry using Cu-Kα or Cu-Kα1 radiation, the thermal spray material has an S0 to S1 ratio of 0.10 or smaller, the S0 being an intensity of a maximum peak assigned to a rare earth oxide, and the S1 being an intensity of a maximum peak assigned to the rare earth oxyfluoride, both observed in a 2θ angle range of from 20° to 40°.

2. The thermal spray material according to claim 1, wherein, before the ultrasonic dispersion at 300 W for 15 minutes, upon being analyzed by X-ray diffractometry using Cu-Kα or Cu-Kα1 radiation, the thermal spray material has an S1 to S2 ratio of 0.10 or greater, the S1 being the intensity of the maximum peak assigned to the rare earth oxyfluoride, and the S2 being an intensity of a maximum peak assigned to the rare earth fluoride, both observed in a 2θ angle range of from 20° to 40°.

3. The thermal spray material according to claim 2, wherein the rare earth of the rare earth oxyfluoride, the rare earth of the rare earth fluoride, and the rare earth of the rare earth oxide are at least one selected from yttrium, samarium, gadolinium, dysprosium, erbium, and ytterbium.

4. The thermal spray material according to claim 3, wherein the rare earth of the rare earth oxyfluoride, the rare earth of the rare earth fluoride, and the rare earth of the rare earth oxide are yttrium.

5. The thermal spray material according to claim 1, wherein the rare earth of the rare earth oxyfluoride, the rare earth of the rare earth fluoride, and the rare earth of the rare earth oxide are at least one selected from yttrium, samarium, gadolinium, dysprosium, erbium, and ytterbium.

6. The thermal spray material according to claim 5, wherein the rare earth of the rare earth oxyfluoride, the rare earth of the rare earth fluoride, and the rare earth of the rare earth oxide are yttrium.

* * * * *